United States Patent
Wasielewski et al.

(10) Patent No.: US 9,687,949 B2
(45) Date of Patent: Jun. 27, 2017

(54) DUST COLLECTION ATTACHMENT SYSTEM FOR HANDHELD POWER TOOLS

(75) Inventors: Kevin Wasielewski, Schaumburg, IL (US); Josh Barhitte, Chicago, IL (US); Timothy Baker, Aurora, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1338 days.

(21) Appl. No.: 12/700,354

(22) Filed: Feb. 4, 2010

(65) Prior Publication Data
US 2011/0185869 A1    Aug. 4, 2011

(51) Int. Cl.
  *B23Q 11/00* (2006.01)
  *B24B 55/10* (2006.01)
  *B25F 5/02* (2006.01)

(52) U.S. Cl.
  CPC ...... *B23Q 11/0046* (2013.01); *B23Q 11/0042* (2013.01); *B24B 55/102* (2013.01); *B25F 5/02* (2013.01); *Y02P 70/171* (2015.11); *Y10T 83/207* (2015.04)

(58) Field of Classification Search
  CPC .................................................. A47L 9/0036
  USPC ............... 144/252.1, 252.2, 136.95; 408/67; 409/137, 182; 83/100; 451/449, 451, 451/453, 456
  See application file for complete search history.

(56) References Cited

U.S. PATENT DOCUMENTS

| | | | | |
|---|---|---|---|---|
| 4,064,952 A | * | 12/1977 | Lechner | 175/209 |
| 4,361,957 A | * | 12/1982 | Krotz | 30/124 |
| 4,674,548 A | * | 6/1987 | Mills et al. | 144/154.5 |
| 5,129,467 A | * | 7/1992 | Watanabe et al. | 173/75 |
| 5,667,565 A | * | 9/1997 | Gondar | 96/60 |
| 5,988,954 A | * | 11/1999 | Gaskin et al. | 408/67 |
| 6,510,582 B1 | * | 1/2003 | Yoo | 15/323 |
| 6,615,930 B2 | * | 9/2003 | Bongers-Ambrosius et al. | 173/198 |
| 6,854,937 B1 | | 2/2005 | Weiss | |
| 7,451,791 B2 | * | 11/2008 | Cooper et al. | 144/136.95 |
| 7,654,294 B2 | * | 2/2010 | Cooper et al. | 144/136.95 |
| 2002/0063190 A1 | * | 5/2002 | Buck | 248/74.1 |

* cited by examiner

*Primary Examiner* — Matthew G Katcoff
(74) *Attorney, Agent, or Firm* — Maginot Moore & Beck LLP

(57) ABSTRACT

A dust collection attachment system for use with a power tool having an elongated housing with a nose portion including a rotary output shaft. The nose portion is configured to have an accessory device mounted thereon, where the system includes a flexible dust hose attachable to the accessory device for removing dust and particles from the immediate area of the accessory device. The accessory device has a dust exhaust port for connection with the hose and a hose support removably attached to a rear end portion of the power tool opposite the nose portion thereof for supporting the dust hose The support includes a releasable mounting clasp on one end for attachment to the rear end of the power tool and a hose retaining clip attached to the mounting clasp.

17 Claims, 4 Drawing Sheets

DUST COLLECTION ATTACHMENT SYSTEM FOR HANDHELD POWER TOOLS

BACKGROUND OF THE INVENTION

The present invention generally relates to small handheld power tools, and more particularly to a dust collection attachment system for such tools.

Small handheld power tools that perform drilling, sawing and other types of cutting and the like are known in the prior art and have been widely used by hobbyists, artisans, tradesmen and others in a wide variety of applications. Such rotary hand tools generally have a motor with a rotary output shaft that extends from a nose portion that is more recently configured to connect to various accessories or attachment devices. Some of these rotary hand tools are quite powerful for their size and are used by tradesmen in the building trades as spiral saws that use a side cutting rotary bit to penetrate and rapidly cut holes in drywall paneling for electrical switches, outlets, light fixtures and the like.

As is known in the art, such rotary hand tool tasks can be more easily performed by using an accessory device that is attached to the tool. For example, a depth adjustment accessory device is often used with such a cutting tool to limit the penetration of a cutting bit, particularly a spiral bit which is used to cut openings and the like in a drywall sheet. Other types of accessory devices may be used to facilitate increased control for delicate and/or accurate detail cutting.

There is an increased awareness of health considerations in the use of hand tools which create dust and other airborne particles that may be adjusted by a user during operation of such tools. Also, the general desire to limit the dispersion of dust and particles in an area where such a tool is being used is highly desirable. It is for these reasons that many of the accessory devices that have been designed and marketed have a capability of collecting dust in association with some type of vacuum source that may be available to the user of such tools.

SUMMARY OF THE INVENTION

Embodiments of the present invention are directed to a dust collection attachment system for use with a power tool having an elongated housing with a nose portion with a rotary output shaft, the nose portion being configured to have an accessory device mounted thereon, the system comprising a flexible dust hose attachable to the accessory device for removing dust and particles from the immediate area of the accessory device, the accessory device having a dust exhaust port for connection with the hose and a hose support removably attached to a rear end portion of the power tool opposite the nose portion thereof for supporting the dust hose, the support having a releasable mounting clasp on one end for attachment to the rear end of the power tool and a hose retaining clip attached to the mounting clasp Other embodiments comprise a compact adapter for interconnecting the dust hose and a selected one of multiple diameter hoses for connection to a vacuum source.

DETAILED DESCRIPTION

The present invention is directed to a dust collection attachment system for use with a relatively small handheld power tool of the type which has an elongated housing that is sized to be easily held with a single hand by a user. The housing has a nose portion with an output shaft that is accessible through an opening. The nose portion is designed and configured to receive various types of accessory devices that can be mounted on the nose portion. While it is noted that such power tools generally have a rotary output shaft, it should be understood that the dust collection attachment system embodying the present invention could be used with other types of small power tools, including those that have an oscillating output shaft, or many types of small tools which are particularly designed and configured to be connected to a dust hose that extends to a source of the vacuum and which is designed to carry dust and other small particulate matter away from the tool during use.

While many tools purport to have such dust collection capability it is well known that the effectiveness and efficiency of many of them leave much to be desired. This is particularly true if the tool is one which is being used in a freehand manner where the tool is moved by the user, rather than being stationary with the work piece being crafted at a more or less stationary position. One of the detractions of many systems that are used with such handheld tools is the inability to keep the hose from being disconnected from the tool or from the vacuum source because of tension that is applied to the hose because the tool has been moved to a location beyond the reach of the dust hose or because the hose becomes caught on a work bench, table or other object in the area.

Another consideration and potential for interconnection problems is that the dust hose that is attached to the tool may be required to be interfaced with a vacuum source that has a different sized duct hose. One particular product that is well known to consumers is the Shop Vac vacuum systems which have various sized hoses. Commonly available vacuum models of this type have any one of several diameters of vacuum hoses, including 1¼", 1½", 2¼" and 2½". Since the dust hose of such small handheld tools is often much less than the 1¼" size, an adaptor is necessary for interconnecting the dust hose tool with the vacuum source dust hose. While such adaptors are known in the prior art, none has the compactness and convenience that is provided with the dust hose adaptor that is an embodiment of the present invention.

Figure 1:
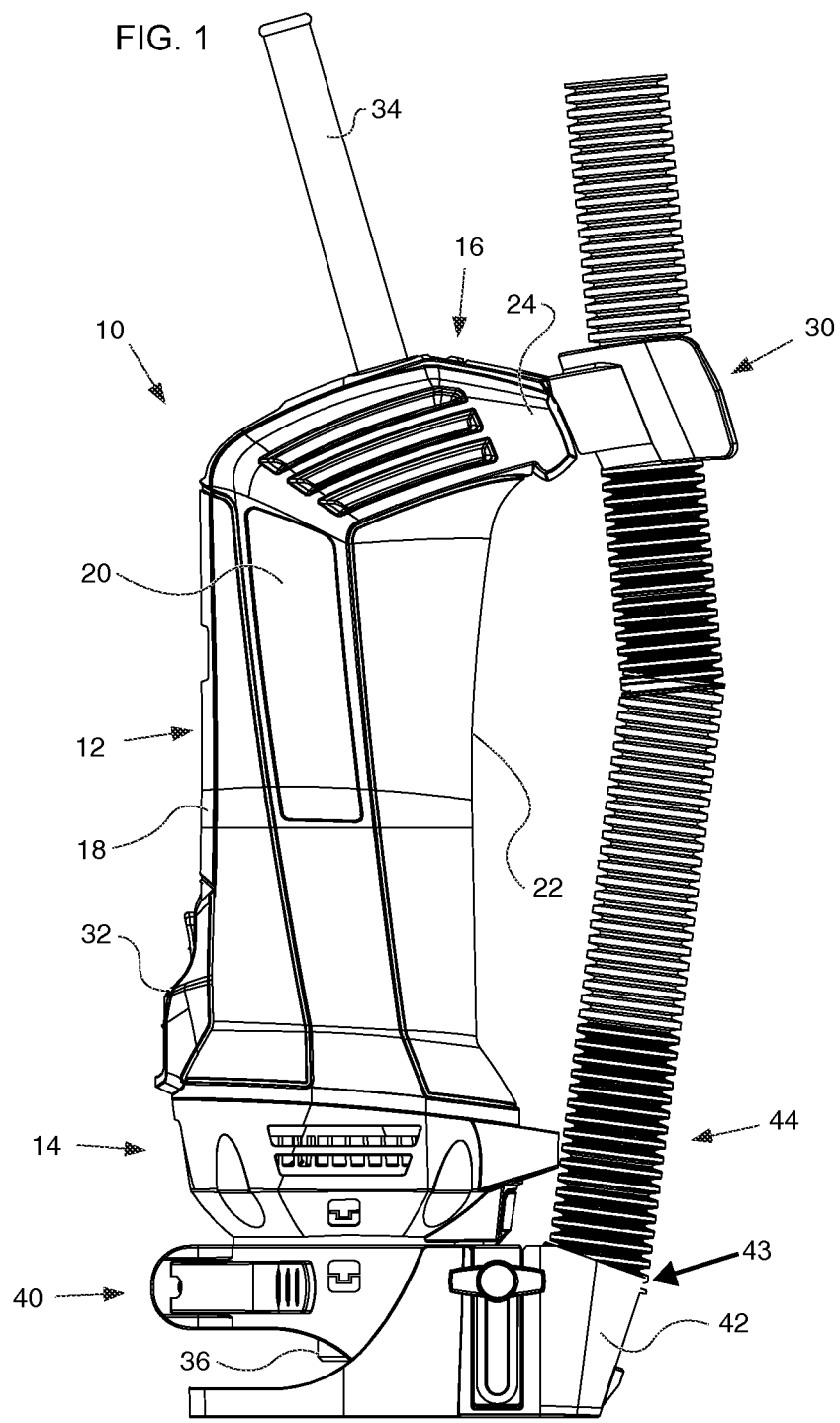
FIG. 1 is a left plan view of a handheld rotary power tool having an elongated housing with a bottom nose portion to which a depth guide accessory device is attached and also illustrating portions of the dust collection attachment system embodying the present invention, particularly showing a dust hose attached to the depth guide and a clip at the rear upper end of the hand tool for supporting the depth hose.

Turning now to the drawings and particularly FIG. 1, an elongated power tool, indicated generally at 10, is shown and has an elongated housing, indicated generally at 12, a nose portion, indicated generally at 14, and a rear end portion, indicated generally at 16. The housing has a top surface 18, side surfaces 20 and a bottom surface 22 and a motor is contained within the housing. The size of the housing 12 is such that most users can grip the tool with one hand with their fingers curling around under the bottom portion 22. The rear end portion 16 is provided with a transverse extension 24 that includes a recess (not shown) for receiving a removable hose support, indicated generally at 30.

When a person is holding the tool 10 as described, their thumb is in position to operate a switch 32 which turns on the motor for operating the tool. The switch 32 is preferably designed so that can be slidingly moved between its ON and OFF positions. The tool 10 shown in FIG. 1 has a power cord 34 that can be plugged into a source of AC power. It should be understood that power tools similar to that shown in FIG. 1 may incorporate battery packs and in such event, they may be slightly larger.

Figure 8:
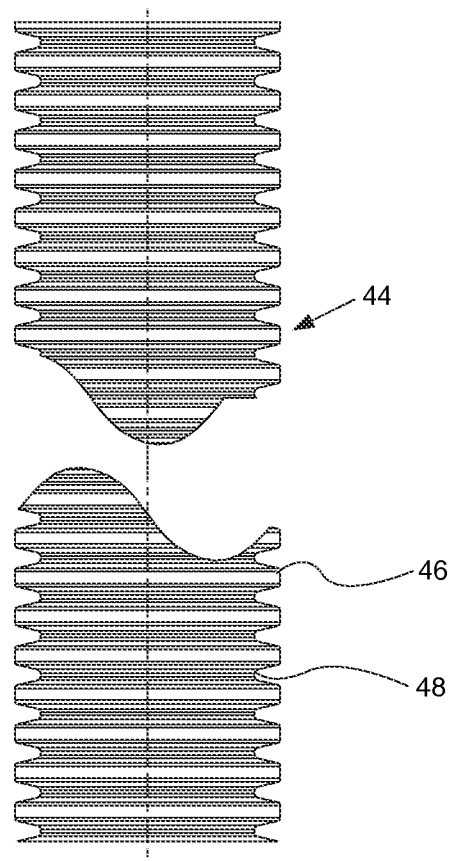
FIG. 8 is an enlarged plan view of a portion of the dust hose shown in FIG. 1.

The tool 10 has an output shaft 36 that is rotatable and preferably is designed to have a collet nut or other attaching mechanism for holding a tool bit, such as a spiral cutting bit or the like. The tool 10 shown in FIG. 1 also has a depth guide attachment device, indicated generally at 40, that can be adjusted to control the depth of penetration of the tool bit that is mounted to the output shaft 36. The depth guide 40 has a rear extension 42 that has an internal opening, or dust port 43 configured to receive a dust hose 44 in fitting engagement, with the opening communicating to an area adjacent the output shaft 36. While not shown, the opening in the extension 42 is preferably circular in size so that the dust hose which preferably has a circular cross-sectional outer surface can be snuggly fit within the extension 42 so as to not be easily dislodged. The dust hose 44 is also shown in FIG. 8 to have a plurality of adjacent ribs 46 that are separated by a smaller diameter recess 48. The hose is preferably made of a material that permits some pressure to facilitate placing and removing the hose 44 from the extension 42. More particularly, it is preferably made of a plastic material or a plastic-like material or rubber and one preferred material is polypropylene. As is shown in FIG. 1, the hose 44 is retained in the extension 42 of the depth guide 40 and is also retained in the hose support 30 at the rear end portion of the tool 10.

Figure 2:
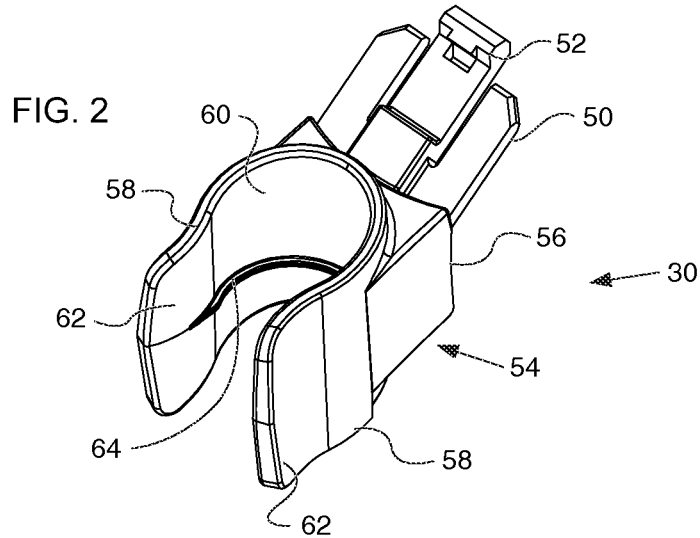
FIG. 2 is an isomeric view illustrating the hose clip shown in FIG. 1.
Figure 3:
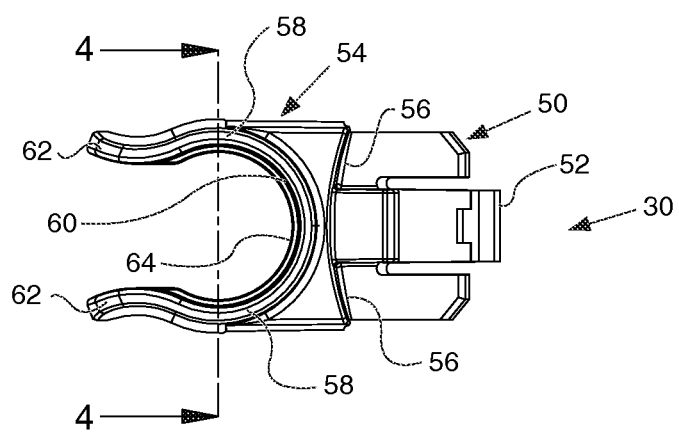
FIG. 3 is a top view of the hose clip shown in FIG. 2.
Figure 4:
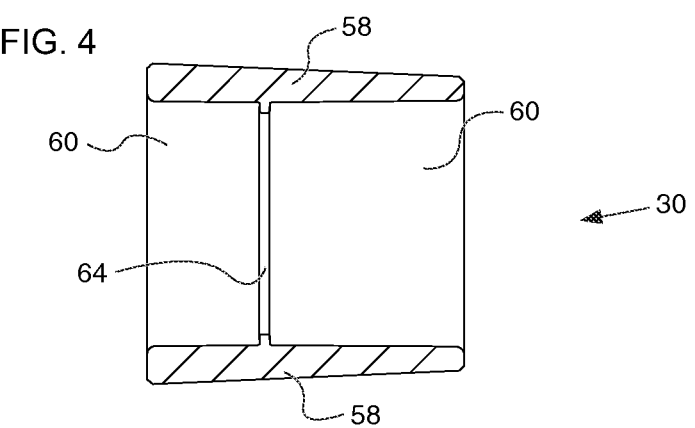
FIG. 4 is a cross-section taken generally along the line 4-4 of FIG. 3.

With regard to the hose support 30 shown in FIGS. 2-4, it has a releasable retaining clasp 50 that has a flexible tab 52 in its outer center portion thereof. The retaining clasp 50 is designed to fit within an aperture in the extension 24 of the rear end 16 of the housing 12 and is designed to be manipulated and released from the extension 24 if desired. The hose support 30 has a retaining clip portion 54 that is connected to the retaining clasp portion 50, with the retaining clip portion 54 having a surface 56 that is designed and configured to seat against the outer surface surrounding the aperture in the extension 24. It is shown to be slightly curved, but its actual shape is not particularly important so long as it facilitates the hose support snuggly fitting onto the extension 24. The retaining clip 54 is shown to have sidewalls 58 which define a cylindrical opening 60 that extends slightly more than 180° of a cylindrical surface and as best shown in FIG. 3 extend about 210°. The outer ends 62 of the sidewalls 58 are flared outwardly away from one another to present a larger opening in which the dust hose 44 can be inserted into the retaining clip 54. The hose support 30 is preferably made of a plastic or plastic-like material such as glass filled nylon that has some flexibility so that the mounting clasp can be deflected during insertion and removal of the mounting clasp 50 into the aperture in the extension 24 and so that it may provide some amount of deflection of the sidewalls 58 when the dust hose 44 is inserted into the cylindrical opening 60 of the retaining clip 54. The interior surface of the opening 60 has a raised rib 64 that extends substantially around the interior surface and is configured to protrude into the recesses 48 being adjacent ribs 46 of the dust hose 44. This will prevent the hose from sliding out of the retaining clip portion 54 in the direction of the axis of the output shaft which can also be considered to be the axis of the tool 10 itself. The effect of the hose support 30 is to provide an additional support for the hose after it extends beyond the tool itself and prevents tension that might otherwise cause the friction fit of the dust hose 44 in the extension 42 to fail.

As previously discussed, the dust hose 44 is functional, must be interfaced with a vacuum source and many users, including obvious and craftsmen alike, may employ a Shop Vac or similar device which has a larger hose than the dust hose 44. The interconnection of the dust hose 44 and a Shop Vac hose can be strategically located to minimize the convenience of using a vacuum system for a user. In this regard, the waste of the larger diameter hose and its location may interfere with a user doing the intended work. A convenient location for the interconnection is often located on the user's body, such as near their belt. The dust hose 44 should be sufficiently long so that the user can extend his hands and arms fully, such as might occur when cutting holes in a ceiling or the like and therefore, the interconnection may conveniently support the weight of the vacuum source hose and not provide significant tension on the tool dust hose 44. In this regard and referring to FIGS. 5-7, an adaptor, indicated generally at 70, is provided.

Figure 5:
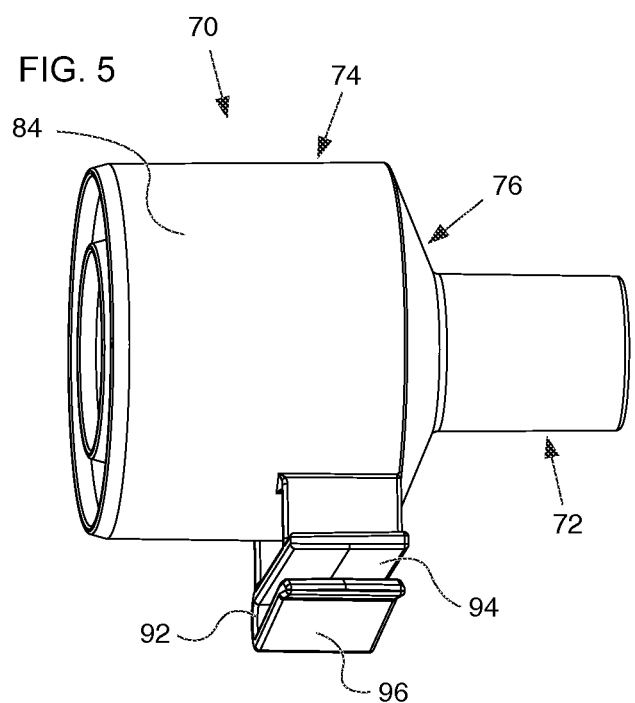
FIG. 5 is an isomeric view of an adaptor for interconnecting said dust hose and a selected one of multiple sized larger hoses that extend to a vacuum source.
Figure 6:
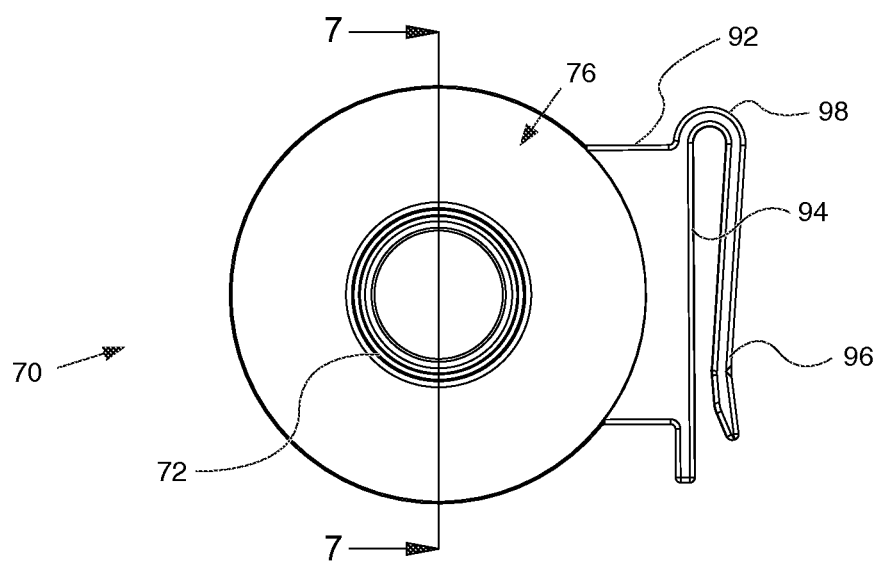
FIG. 6 is a right end view of the adaptor shown in FIG. 5.
Figure 7:
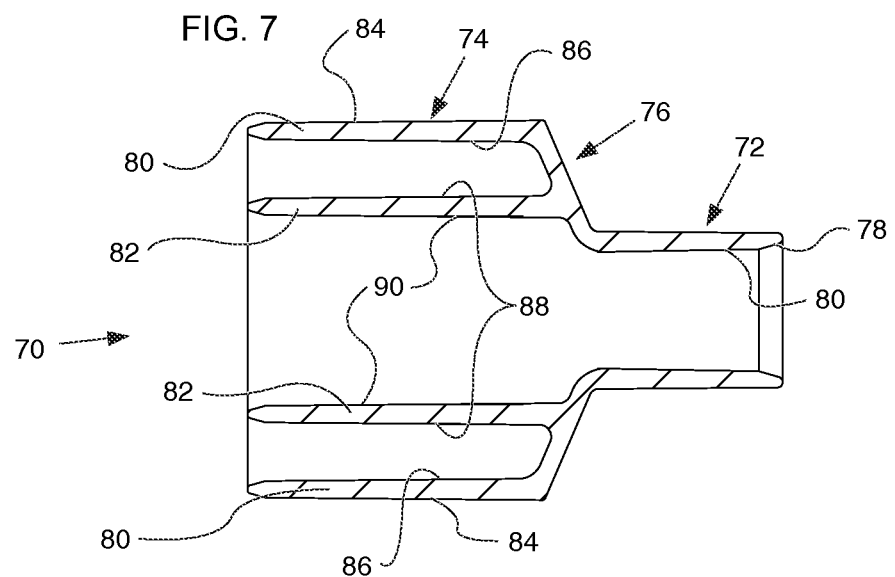
FIG. 7 is a cross-section taken generally along the line 7-7 of FIG. 6.

The adaptor 70 is compact in its design and is particularly suited to interconnect the dust hose 44 with any one of four different sized dust hoses from a Shop Vac or other vacuum source. The adaptor has an inlet portion 72 and an outlet portion 74 with the tubing connected together by a generally conical transition portion 76. The inlet portion 72 has a chamfered inner surface 78 and an inner wall surface 80 that has a diameter that is approximately that of the outer diameter of the dust hose 44. It is preferred that it gradually reduce in size from the outer end having the chamfer 78 so that the friction fit between the hose 44 will increase. The outlet portion 74 has an outer wall 80 and an inner wall 82 which are preferably concentric with one another. The outer thickness of each of the walls 80 and 82 are preferably sized so that the inner and outer surfaces of the walls correspond to either the inside or outside diameter of a standard commercially available Shop-Vac or similar product. Thus, the outside diameter of the wall 80 is defined by a surface 84 and the inside wall defined by a surface 86. Similarly, the outside diameter of wall 82 is defined by surface 88 and the inside diameter is defined by the inside surface 90 with a thickness of approximately ¼" for each of the inner and outer walls 80 and 82, together with the diameters of the walls can result in friction fitting of Shop-Vac units having 1¼", 1½", 2¼" and 2½" commonly available sizes. The outer ends of both walls 80 and 82 are tapered as shown in FIG. 7 which facilitates sliding the vacuum source dust hose onto the adaptor 70. As shown in FIGS. 5 and 6, a belt clip 92 is provided on the outside wall of the outer portion 74 near the transition portion 76 so as not to interfere with the outer surface that the largest Shop-Vac hose may be slid onto. The belt clip 92 has an inner surface 94 and a clip portion 96 that is attached to the inner surface 94 at the top thereof 98.

The adaptor 70 is preferably also made with a plastic or plastic-like material or rubber, with the preferred material being polypropylene. The use of polypropylene allows some flexure in the overall structure and is not conducive to breaking or cracking under normal and expected use. The entire adaptor may be easily molded as a unitary object.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A dust collection attachment system for use with a power tool having an elongated housing with a nose portion with a rotary output shaft, the nose portion being configured to have an accessory device mounted thereon, said system comprising:
    a flexible dust hose attachable to the accessory device for removing dust and particles from the immediate area of the accessory device, the accessory device having a dust exhaust port for connection with said hose; and
    a hose support removably attached to a rear end portion of the power tool opposite the nose portion thereof for supporting said dust hose, said support having a releasable retaining clasp and a flexible tab on one end, said releasable retaining clasp being inserted in and connected to an aperture defined by said rear end of the power tool and released from said aperture, said support also including an open-ended hose retaining clip attached to said releasable retaining clasp and configured to receive at least a portion of said dust hose,
    wherein said hose retaining clip has a recess for receiving said dust hose, said opening being formed by side walls that extend slightly beyond half of the circumference of said dust hose, which side walls then flare outwardly from one another, and said recess is generally in the shape of a cylindrical opening between said flared side walls, a diameter of said cylindrical opening is generally the same as the outside diameter of said dust hose, and
    wherein said dust hose has an outer surface configuration with a plurality of spaced apart annular ribs and said hose retaining clip has at least one circumferential rib extending radially inwardly into said recess, the circumferential rib being configured to extend between two adjacent ribs of said dust hose ribs to prevent lengthwise movement of said dust hose relative to said hose support.

2. The dust collection attachment system as defined in claim 1 wherein the power tool has a recess in the power tool housing configured to accept and retain said releasable retaining clasp of said hose support.

3. The dust collection attachment system as defined in claim 1 wherein said hose support is made of a material that permits some flexure to facilitate placing and removing said dust hose to and from said support.

4. The dust collection attachment system as defined in claim 3 wherein said material is selected from the group consisting of a plastic material or rubber.

5. The dust collection attachment system as defined in claim 3 wherein said material is glass filled nylon.

6. The dust collection attachment system as defined in claim 1 wherein said dust hose has a diameter within the range of about ¾ inch to about 1¼ inch.

7. A dust collection attachment system for use with a power tool having an elongated housing with a nose portion with a rotary output shaft, the nose portion being configured to have an accessory device mounted thereon, said system comprising:
    a flexible dust hose attachable to the accessory device for removing dust and particles from the immediate area of the accessory device, the accessory device having a dust exhaust port for connection with said hose;
    a hose support removably attached to a rear end portion of the power tool opposite the nose portion thereof for supporting said dust hose, said support having a releasable retaining clasp and a flexible tab on one end, said releasable retaining clasp being inserted in and connected to an aperture defined by said rear end of the power tool and released from said aperture, said support also including an open-ended hose retaining clip attached to said releasable retaining clasp and configured to receive at least a portion of said dust hose; and
    an adapter configured to interconnect said dust hose with a selected one of a variety of hoses having different diameters and which are configured to connect the dust hose to a vacuum source.

8. The dust collection attachment system as defined in claim 7 wherein:
    said adapter has a cylindrical inlet portion and a cylindrical outlet portion,
    said inlet portion has a diameter sized to connect to said dust hose and said outlet portion is connected to and is in communication with said inlet portion,
    said outlet portion comprises an outer cylindrical wall and an inner cylindrical wall axially aligned with one another,
    said outer cylindrical wall has a first predetermined thickness such that the outer surface thereof has a first predetermined diameter and the inner surface thereof has a second predetermined diameter,
    said inner cylindrical wall has a second predetermined thickness such that the outer surface thereof has a third predetermined diameter and the inner surface thereof has a fourth predetermined diameter, and
    each of said first, second, third and fourth diameters correspond to a diameter of one of said variety of hoses configured to be connected to the vacuum source.

9. The dust collection attachment system as defined in claim 7 wherein said adapter is made of a material that permits some flexure to facilitate placing and removing said hoses for connection to a vacuum source.

10. The dust collection attachment system as defined in claim 9 wherein said material is selected from the group consisting of a plastic material or rubber.

11. The dust collection attachment system as defined in claim 9 wherein said material is polypropylene.

12. The dust collection attachment system as defined in claim 8 wherein said outer end of each of said inner and outer walls being chamfered to facilitate mounting of a hose onto said adapter.

13. The dust collection attachment system as defined in claim 8 further comprising a belt clip integrally formed on said outlet portion, said belt clip having a generally flat inner surface and a resilient outer clip portion oriented generally parallel to said inner surface and attached to said inner surface at one end thereof, said outer clip portion being flared away from said inner surface at the end opposite said one end to facilitate attaching said adapter to a user's belt or garment.

14. The dust collection attachment system as defined in claim 7 wherein said dust hose has a flexible hollow thin wall with a plurality of spaced apart annular ribs.

15. The dust collection attachment system as defined in claim 14 wherein said hose retaining clip is generally C shaped.

16. The dust collection attachment system as defined in claim 7 wherein said hose retaining clip has a recess for receiving said dust hose, said opening being formed by side walls that extend slightly beyond half of the circumference of said dust hose, which side walls then flare outwardly from one another.

17. The dust collection attachment system as defined in claim 16 wherein said recess is generally in the shape of a cylindrical opening between said flared side walls, wherein the diameter of said cylindrical opening is generally the same as the outside diameter of said dust hose.

\* \* \* \* \*